US009228467B2

(12) United States Patent
Swoish et al.

(10) Patent No.: US 9,228,467 B2
(45) Date of Patent: Jan. 5, 2016

(54) UREA INJECTION CONTROLLER FOR A MOTORIZED SYSTEM

(71) Applicant: GM Global Technology Operations LLC, Detroit, MI (US)

(72) Inventors: Christopher C. Swoish, Lapeer, MI (US); Thomas Larose, Jr., Howell, MI (US); Christopher Whitt, Howell, MI (US); Joshua Clifford Bedford, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 130 days.

(21) Appl. No.: 14/022,973

(22) Filed: Sep. 10, 2013

(65) Prior Publication Data

US 2015/0068197 A1   Mar. 12, 2015

(51) Int. Cl.
*F01N 3/00* (2006.01)
*F01N 3/20* (2006.01)
*B01D 53/94* (2006.01)
*F01N 3/035* (2006.01)

(52) U.S. Cl.
CPC ............ *F01N 3/208* (2013.01); *B01D 53/9431* (2013.01); *B01D 53/9495* (2013.01); *F01N 3/035* (2013.01); *B01D 2251/2067* (2013.01); *F01N 2610/02* (2013.01); *F01N 2900/1602* (2013.01)

(58) Field of Classification Search
CPC ...... B01D 53/9495; F01N 3/035; F01N 3/208
See application file for complete search history.

(56) References Cited

U.S. PATENT DOCUMENTS

| 6,119,452 A * | 9/2000 | Kinugasa et al. ............... 60/285 |
| 7,229,597 B2 * | 6/2007 | Patchett et al. ............... 422/177 |
| 2005/0069476 A1 * | 3/2005 | Blakeman et al. ......... 423/239.1 |
| 2009/0288396 A1 * | 11/2009 | Sakata et al. .................... 60/286 |
| 2010/0058746 A1 * | 3/2010 | Pfeifer et al. .................... 60/297 |
| 2010/0180580 A1 * | 7/2010 | Boorse et al. .................... 60/297 |
| 2011/0000189 A1 * | 1/2011 | Mussmann et al. ............. 60/274 |
| 2011/0162350 A1 * | 7/2011 | Ponnathpur ..................... 60/274 |
| 2011/0219747 A1 * | 9/2011 | Geveci et al. ................... 60/274 |
| 2012/0079812 A1 * | 4/2012 | Masaki .......................... 60/274 |
| 2012/0186229 A1 * | 7/2012 | Phillips et al. .................. 60/274 |
| 2012/0230881 A1 * | 9/2012 | Boger et al. ................... 422/187 |
| 2013/0004391 A1 * | 1/2013 | Pfeifer et al. ............. 423/213.2 |

* cited by examiner

*Primary Examiner* — Jesse Bogue
(74) *Attorney, Agent, or Firm* — Cantor Colburn LLP

(57) ABSTRACT

A urea injection controller for a motorized system includes a passive regeneration model configured and disposed to calculate an amount of NOx conversion resulting from an interaction between exhaust gases and soot entrained in a selective catalyst reduction filter (SCRF) device, a replenishment mode trigger module configured to set an ammonia replenishment request based on the passive regeneration model, and a replenishment control module configured to selectively activate a urea injector to discharge a particular amount of urea based on the regeneration model.

20 Claims, 3 Drawing Sheets

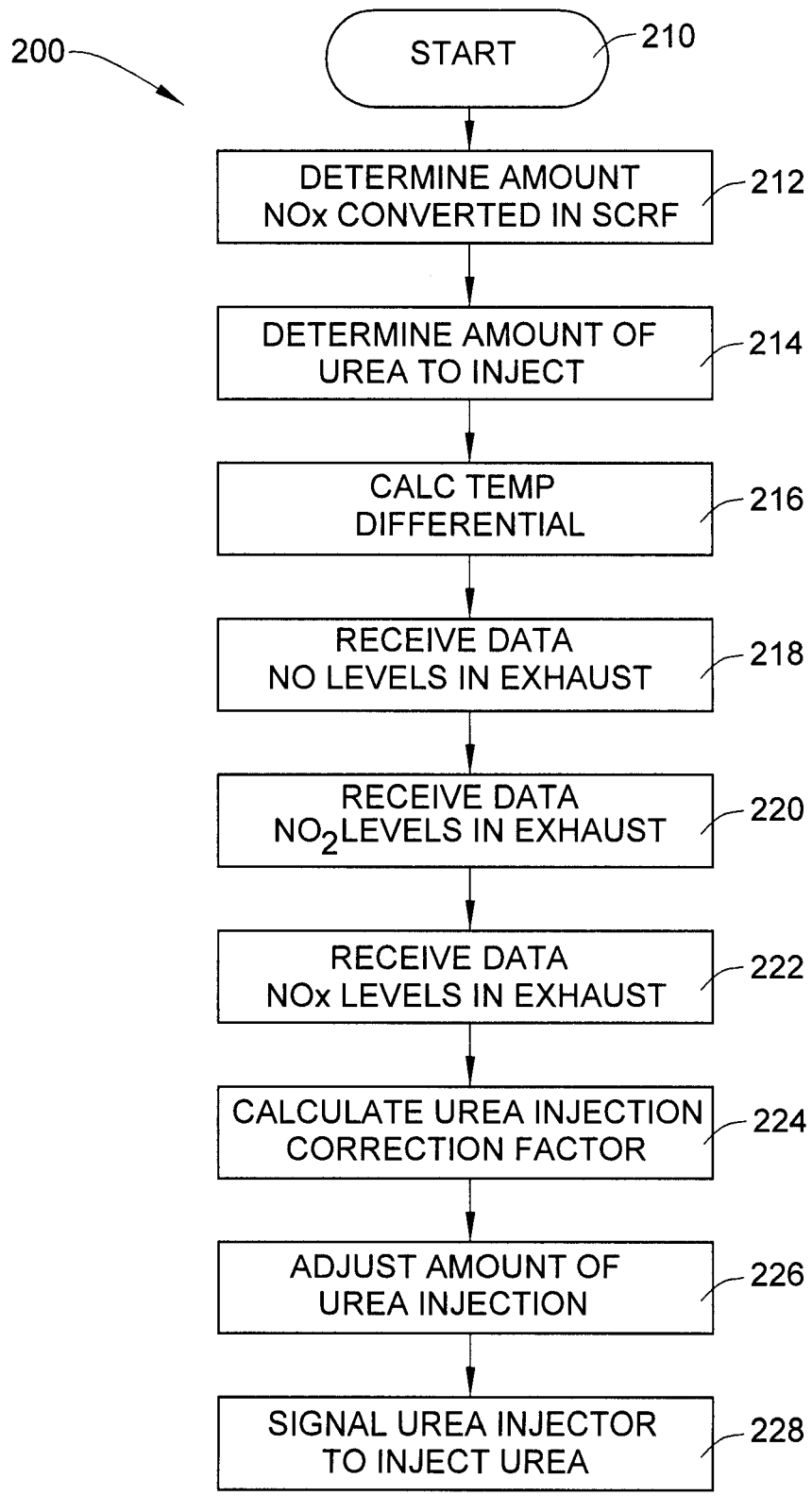

UREA INJECTION CONTROLLER FOR A MOTORIZED SYSTEM

FIELD OF THE INVENTION

The subject invention relates to the art of motorized systems and, more particularly to a urea injection controller for a motorized system.

BACKGROUND

Motorized systems include both stationary mechanisms such as generators, pumps and the like, and moveable mechanisms, such as motor vehicles, including cars, truck, locomotives, and ships. Often times the motorized systems employ a power system including a selective catalytic reduction (SCR) device that converts NOx with the aid of a catalyst into diatomic nitrogen and water. In many cases, the SCR device relies upon ammonia as a reductant that is absorbed into the catalyst. Over time, the ammonia in the catalyst depletes and requires replenishment. Many systems employ a urea injector to add ammonia back to the catalyst. The urea injector is controlled to introduce a set amount of urea into the SCR device based on known conversion efficiencies. Existing urea injection controllers base urea injection on active NOx regeneration (interaction between NOx and the catalyst). However, in addition to active NOx regeneration, many SCR devices experience passive NOx regeneration, or regeneration that does not deplete ammonia storage. Accordingly, it is desirable to provide a urea injector controller that determines urea injection based on both active and passive NOx regeneration.

SUMMARY OF THE INVENTION

In accordance with an exemplary embodiment, a urea injection controller for a motorized system includes a passive regeneration model configured and disposed to calculate an amount of NOx conversion resulting from an interaction between exhaust gases and soot entrained in a selective catalyst reduction filter (SCRF) device, a replenishment mode trigger module configured to set an ammonia replenishment request based on the passive regeneration model, and a replenishment control module configured to selectively activate a urea injector to discharge a particular amount of urea based on the regeneration model.

In accordance with another exemplary embodiment, an internal combustion engine includes an engine fluidically connected to an exhaust gas conduit. A selective catalyst reduction filter (SCRF) device is fluidically connected to the exhaust gas conduit. A urea injector is fluidically connected to the exhaust gas conduit upstream of the SCRF device. The urea injector is operatively connected to a urea injection controller including a passive regeneration model configured and disposed to calculate an amount of NOx conversion resulting from an interaction between exhaust gases and soot entrained in the SCRF device, a replenishment mode trigger module configured to set an ammonia replenishment request based on the passive regeneration model, and a replenishment control module configured to selectively activate a urea injector to discharge a particular amount of urea based on the regeneration model.

In accordance with yet another exemplary embodiment, a method of replenishing urea in a selective catalytic reduction filter (SCRF) device includes calculating an amount of NOx reduction in exhaust gases passing from the SCRF device, calculating an amount of urea injection to maintain ammonia in the SCRF device at a desired level, determining an amount of passive regeneration associated with the amount of NOx reduction, and adjusting the amount of urea injection based on the amount of passive regeneration associated with the amount of NOx reduction.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 3 is a flowchart illustrating a method of injecting urea into an exhaust conduit fluidically connected to a SCRF device, in accordance with exemplary embodiments.

DESCRIPTION OF THE EMBODIMENTS

Figure 1:
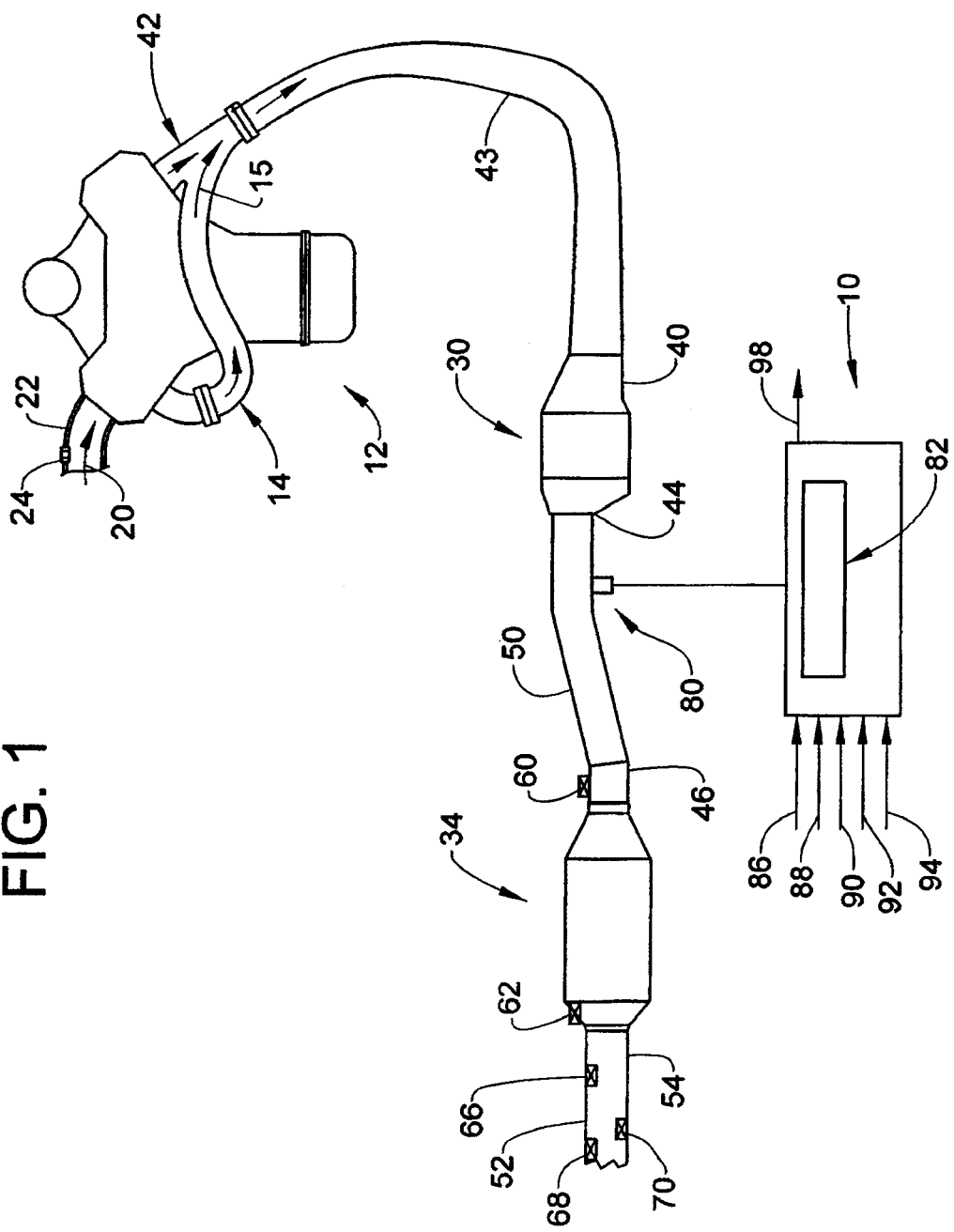
FIG. 1 is a schematic view of an internal combustion engine including a selective catalytic reduction filter (SCRF) device and a urea injection controller, in accordance with exemplary embodiments.

The following description is merely exemplary in nature and is not intended to limit the present disclosure, its application or uses. It should be understood that throughout the drawings, corresponding reference numerals indicate like or corresponding parts and features.

As used herein, the term "module" refers to an application specific integrated circuit (ASIC), an electronic circuit, a processor (shared, dedicated, or group) and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

Referring now to FIG. 1, an exemplary embodiment is directed to a urea injection controller 10 for a motorized system shown as an internal combustion ("IC") engine 12. An exhaust system 14, which may comprise several segments, transports exhaust gas 15 from the IC engine 12. More specifically, IC engine 12 is configured to receive intake air 20 from an air intake passage 22. The intake air passage 22 includes an intake mass airflow sensor 24 for determining the intake air mass of the IC engine 12. In one embodiment, the intake mass airflow sensor 24 may be either a vane meter or a hot wire type intake mass airflow sensor; however, it is to be understood that other types of sensors may be used as well. Intake air 20 mixes with fuel (not shown) to form a combustible mixture. The combustible mixture is compressed to combustion pressure in a combustion chamber of IC engine 12 and ignited to produce work, i.e., engine output and exhaust gases 15. Exhaust gases 15 pass from the IC engine 12 through exhaust system 14 to various aftertreatment devices.

In the exemplary embodiment as illustrated, aftertreatment devices of exhaust system 14 include a diesel oxidation catalyst (DOC) device 30 fluidically connected to a selective catalytic reduction filter (SCRF) device 34. More specifically, DOC device 30 includes an inlet 40, that may be connected to an exhaust manifold 42 of IC engine 12 through a first exhaust pipe 43, and an outlet 44. Outlet 44 is fluidically connected to an inlet 46 of SCRF device 34 through a second exhaust pipe 50. A third exhaust pipe 52 extends from an outlet 54 of SCRF device 34. A first temperature sensor 60 is arranged at inlet 46 of SCRF device 34 and a second temperature sensor 62 is arranged at outlet 54 of SCRF device 34. First temperature sensor 60 detects exhaust gas temperature upstream of SCRF device 34 and second temperature sensor 62 detects exhaust gas temperature downstream of SCRF 34. In addition, a nitrogen oxide (NO) sensor 66 configured to detect an amount of NO in exhaust gas 15, a nitrogen dioxide ($NO_2$) sensor 68 configured to detect an amount of $NO_2$ in exhaust gas 15, and a NOx sensor 70 configured to detect an amount of NO, $NO_2$ and other nitrogen oxides are arranged downstream of outlet 54. It should be understood that while shown as separate sensors, it should be understood that NO sensor 66, $NO_2$ sensor 68 and NOx sensor 70 may be combined into a single NOx sensing unit. Exhaust system 14 may also include additional aftertreatment devices (not shown).

In accordance with an exemplary embodiment of the invention, urea injection controller 10 is operatively connected to urea injector 80. Urea injection controller 10 includes a control module 82 having logic that calculates an amount of urea needed to replenish depleted ammonia from SCRF device 34 resulting from NOx conversion. Control module 82 determines what portion of NOx was converted as a result of passive regeneration or an interaction between exhaust gas 15 and soot entrained in SCRF device 34 and calculates urea injection to replenish ammonia depleted as a result of active regeneration. In this manner, control module 82 can adjust urea delivery to prevent ammonia slip in SCRF device 34. Urea injection controller 10 includes a first temperature input 86 operatively connected to first temperature sensor 60 and a second temperature input 88 operatively connected to second temperature sensor 62. Urea injection controller 10 also includes an NO input 90 operatively connected to NO sensor 66, and $NO_2$ input 92 operatively connected to $NO_2$ sensor 68 and an NOx input 94 operatively connected to NOx sensor 70. An output 98 provides a signal to urea injector 80 to deliver a desired amount of urea into exhaust system 14. It should be understood that urea injection controller 10 may only include a NOx input.

Figure 2:
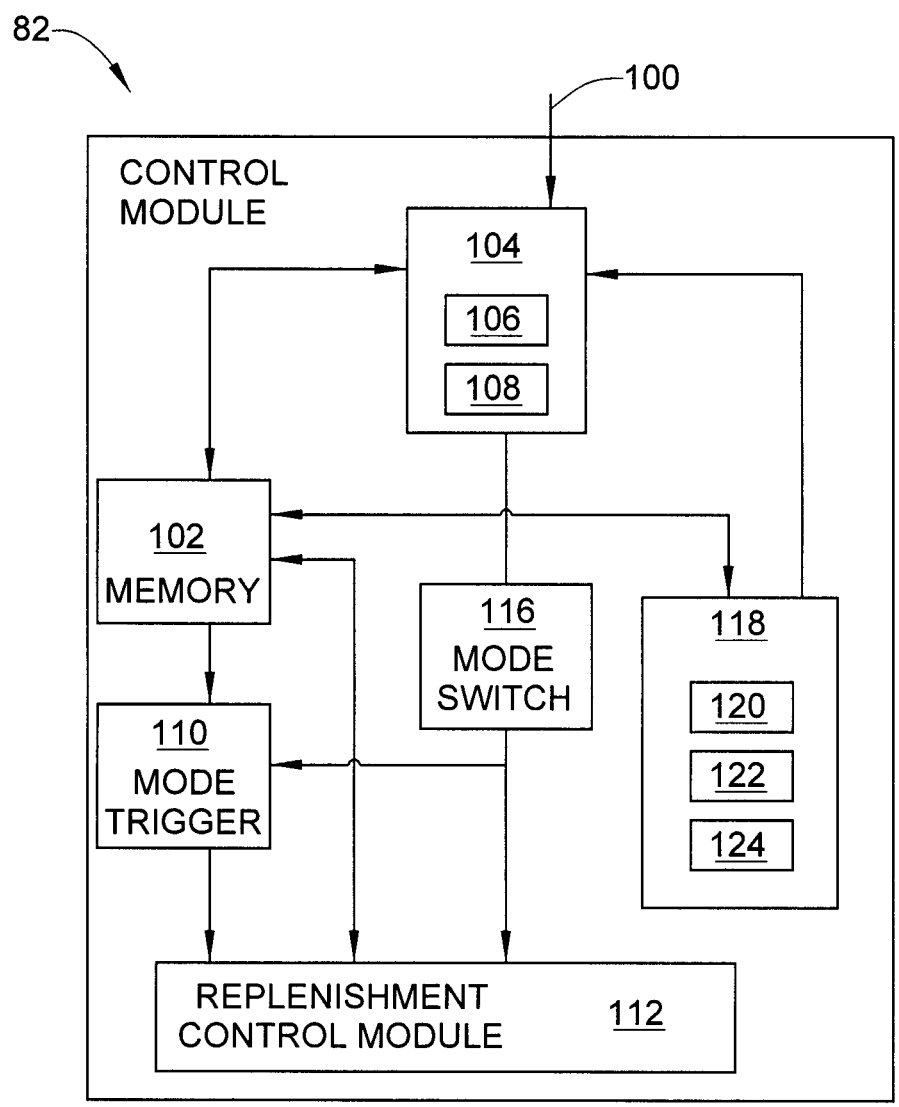
FIG. 2 is a dataflow diagram of the urea injection controller shown in FIG. 1, in accordance with exemplary embodiments.

FIG. 2 is an illustration of a dataflow diagram that illustrates various elements that may be embedded within the control module 82. Various embodiments of the urea injection controller 10 of FIG. 1, according to the present disclosure, may include any number of sub-modules embedded within the control module 82. As can be appreciated, the sub-modules, shown in FIG. 2, may be combined or further partitioned as well. Inputs 100 to control module 82 include data received through first temperature input 86, second temperature input 88, NO input 90, $NO_2$ input 92 and NOx input 94. In the embodiment as shown in FIG. 2, control module 82 includes a memory 102, a regeneration module 104 having a regeneration portion module 106 and a passive regeneration portion module 108, a replenishment mode trigger module 110, a replenishment control module 112, a replenishment mode switch 116 and a look up table module 118 operatively associated with memory 102 and regeneration module 104. Look-up table module 118 may include a first passive regeneration model table 120, a second passive regeneration model table 122, and a third passive regeneration model table 124. Of course, look-up table module may also be provided with a single passive regeneration model table.

The replenishment control module 112 may apply algorithms known in the art to determine when to set a replenishment mode switch 116 to activate replenishment mode trigger module 110 when an amount of ammonia stored in SCRF device 34, of FIG. 1, has dropped below desired levels. For example, the replenishment mode switch 116 may be set when the ammonia falls below a threshold defined in the memory 102. Ammonia replenishment for SCRF 34 device, of FIG. 1, can be based on, or limited, according to regeneration module 104. In one embodiment, regeneration module 104 receives temperature inputs from first and second temperature sensors 60 and 62, of FIG. 1. Regeneration module 104 also receives inputs from one or more of NO sensor 66, $NO_2$ sensor 68, and NOx sensor 70, of FIG. 1. Passive regeneration portion module 108 compares the inputs 100 received from first and second temperature sensors 60 and 62 and the one or more of NO sensor 66, $NO_2$ sensor 68, and NOx sensor 70 with data stored in one or more of first, second and third passive regeneration model tables 120, 122, and 124.

For example, first passive regeneration model table 120 may include a selectively configurable table that compares temperature changes across SCRF device 34 and NO detected by NO sensor 66. Second passive regeneration model table 122 may include a selectively configurable table that compares temperature changes across SCRF device 34 and $NO_2$ detected by $NO_2$ sensor 68. Third passive regeneration model table 124 may include a selectively configurable table that compares temperature changes across SCRF device 34 and NOx detected by NOx sensor 70. First, second, and third passive regeneration values obtained from each passive regeneration model table 120, 122 and 124 may be summed to determine an amount of NOx conversion that may be attributable to passive regeneration or an interaction between exhaust gases 15 and soot entrained within SCRF device 34 to establish a urea injection correction factor. Regeneration portion module 106 determines an overall amount of NOx conversion associated with an active regeneration, or interaction between exhaust gases 15 and a washcoat of SCRF device 34 and passive regeneration. Replenishment control module 112 then determines how much urea should be injected into exhaust system 14 to replenish ammonia depleted in SCRF device 34 by multiplying the amount of urea to be injected based on overall NOx regeneration by the urea injection correction factor to adjust urea injection to account for passive regeneration.

Reference will now follow to FIG. 3 in describing a method 200 of replenishing urea in SCRF device 34. Monitoring is initiated in block 210. Controller 82 determines an amount of NOx converted in SCRF device 34, in block 212, and an amount of urea to inject for washcoat replenishment, in block 214. In block 216, controller 82 calculates a temperature differential across SCRF device 34. In block 218, controller 82 receives data regarding levels of NO in exhaust gases 15. In block 220, controller 82 receives data regarding levels of $NO_2$ in exhaust gases 15. In block 222, controller 82 receives data regarding levels of NOx in exhaust gases 15. In block 224, controller 82 calculates a urea injection correction factor to account for passive regeneration in SCRF device 34. In block 226, controller 82 adjusts that amount of urea to inject based on the urea injection correction factor and signals urea injector 80 to inject an adjusted amount of urea, in block 228.

At this point it should be understood that the urea injection controller, in accordance with exemplary embodiments, determines an amount of urea to inject into an exhaust system to avoid ammonia slip. More specifically, the urea injection controller determines an overall urea injection requirement resulting from NOx conversion in a selective catalytic reduction filter (SCRF) device. Urea injection controller then adjusts that amount of urea to be injected to account for passive regeneration of NOx. More specifically, a portion of NOx regeneration in the SCRF device is attributable to an interaction between exhaust gases and soot. Another portion of the NOx regeneration is attributable to an interaction between exhaust gases and a washcoat in the SCRF device. Interaction between exhaust gases and the washcoat consumes ammonia. Interaction between exhaust gases and soot does not. Therefore, basing urea injection based on total NOx conversion may cause too much ammonia to develop in SCRF device. Accordingly, the urea injection controller reduces urea injection based on passive regeneration or interaction between the exhaust gases and soot. In this manner, the urea injector prevents an over injection of urea which could result in ammonia or $NH_3$ slip. Also, it should be understood that urea injection controller can establish the urea correction factor based on values received from a NOx sensor and need not rely on separate NO, $NO_2$ and NOx sensors.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A urea injection controller for a motorized system including a selective catalyst reduction filter (SCRF) device comprising:
a passive regeneration module configured and disposed to calculate an amount of NOx conversion resulting from an interaction between exhaust gases and soot entrained in the SCRF device;
a replenishment mode trigger module configured to set an ammonia replenishment request based on the amount of NOx conversion resulting from the interaction between exhaust gases and soot entrained in the SCRF device calculated by the passive regeneration module; and
a replenishment control module configured to selectively activate a urea injector to discharge a particular amount of urea based on the amount of NOx conversion resulting from the interaction between exhaust gases and soot entrained in the SCRF device calculated by the passive regeneration module.

2. The urea injection controller according to claim 1, wherein the replenishment control module comprises a urea injection correction factor configured to adjust urea injection based on passive regeneration.

3. The urea injection controller according to claim 1, further comprising a first temperature input configured and disposed to detect exhaust gas temperature upstream of the SCRF device and a second temperature input configured and disposed to detect exhaust gas temperature downstream of the SCRF device.

4. The urea injection controller according to claim 1, further comprising: a memory operatively connected with at least one passive regeneration model table configured and disposed to determine a portion of consumed ammonia resulting from passive regeneration in the SCRF device.

5. The urea injection controller according to claim 4, wherein the at least one passive regeneration model table includes a first passive regeneration model table, a second passive regeneration model table, and a third passive regeneration model table.

6. The urea injection controller according to claim 5, wherein the first passive regeneration model table includes a temperature versus nitrogen oxide (NO) table, the second passive regeneration model table includes a temperature versus nitrogen dioxide ($NO_2$) table, and the third passive regeneration model table includes a temperature versus NOx table.

7. An internal combustion engine comprising:
an engine including an exhaust gas conduit;
a selective catalyst reduction filter (SCRF) device fluidically connected to the exhaust gas conduit;
a urea injector fluidically connected to the exhaust gas conduit upstream of the SCRF device; and
a urea injection controller operatively connected to the urea injector, the urea injection controller comprising:
a passive regeneration module configured and disposed to calculate an amount of NOx conversion resulting from an interaction between exhaust gases and soot entrained in the SCRF device;
a replenishment mode trigger module configured to set an ammonia replenishment request based on the amount of NOx conversion resulting from the interaction between exhaust gases and soot entrained in the SCRF device calculated by the passive regeneration module; and
a replenishment control module configured to selectively activate a urea injector to discharge a particular amount of urea based on the amount of NOx conversion resulting from the interaction between exhaust gases and soot entrained in the SCRF device calculated by the passive regeneration module.

8. The internal combustion engine according to claim 7, wherein the replenishment control module comprises a urea injection correction factor configured to adjust urea injection based on passive regeneration.

9. The internal combustion engine according to claim 7, further comprising: a first temperature sensor arranged upstream of the SCRF device and a second temperature sensor arranged downstream of the SCRF device.

10. The internal combustion engine according to claim 9, wherein the urea injection controller includes a first temperature input operatively connected to the first temperature sensor, and a second a second temperature input operatively connected to the second temperature sensor.

11. The internal combustion engine according to claim 7, further comprising: a nitrogen oxide (NO) sensor and a nitrogen dioxide ($NO_2$) sensor fluidically connected to the exhaust gas conduit, each of the nitrogen oxide (NO) sensor and nitrogen dioxide ($NO_2$) sensor being arranged downstream of the SCRF device.

12. The internal combustion engine according to claim 11, wherein the urea injection controller includes a nitrogen oxide (NO) input operatively connected to the nitrogen oxide (NO) sensor and a nitrogen dioxide ($NO_2$) input operatively connected to the nitrogen dioxide ($NO_2$) sensor.

13. The internal combustion engine according to claim 7, wherein the urea injection controller includes a memory operatively connected with at least one passive regeneration model table configured and disposed to determine a portion of consumed ammonia resulting from passive regeneration in the SCRF device.

14. The internal combustion engine according to claim 13, wherein the at least one passive regeneration model table includes a first passive regeneration model table, a second passive regeneration model table, and a third passive regeneration model table.

15. The internal combustion engine according to claim 14, wherein the first passive regeneration model table includes a temperature versus nitrogen oxide (NO) table, the second passive regeneration model table includes a temperature versus nitrogen dioxide ($NO_2$) table, and the third passive regeneration model table includes a temperature versus NOx table.

16. A method of replenishing urea in a selective catalytic reduction filter (SCRF) device, the method comprising:
  calculating an amount of NOx reduction in exhaust gases passing from the SCRF device;
  calculating an amount of urea injection to maintain ammonia in the SCRF device at a desired level;
  determining an amount of passive regeneration associated with the amount of NOx reduction;
  adjusting the amount of urea injection based on the amount of passive regeneration associated with the amount of NOx reduction.

17. The method of claim 16, wherein determining the amount of passive regeneration includes measuring a first exhaust gas temperature upstream of the SCRF device, a second exhaust gas temperature downstream of the SCRF device, and calculating an exhaust gas temperature differential between the first and second exhaust gas temperatures.

18. The method of claim 17, further comprising: detecting an amount of nitrogen oxide (NO), nitrogen dioxide ($NO_2$) and NOx in exhaust gases passing from the SCRF device.

19. The method of claim 18, further comprising:
  comparing the temperature differential and the amount of nitrogen oxide (NO) in a first passive regeneration model table to determine a first passive regeneration value;
  comparing the temperature differential and the amount of nitrogen dioxide ($NO_2$) in a second passive regeneration model table to determine a second passive regeneration value;
  comparing the temperature differential and the amount of NOx in a third passive regeneration model table to determine a third passive regeneration value; and
  calculating a urea injection correction factor based on at least one of the first, second and third passive regeneration values.

20. The method of claim 19, wherein adjusting the amount of urea injection includes multiplying the amount of urea injection and the urea injection correction factor.

* * * * *